H. J. MILLER.
SAFETY STEERING DEVICE.
APPLICATION FILED OCT. 12, 1914.
1,207,693.
Patented Dec. 5, 1916.
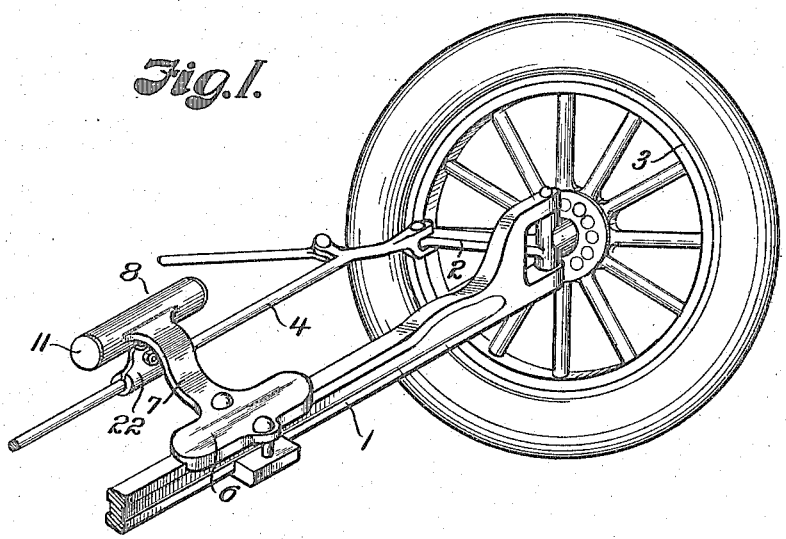
Fig. I.
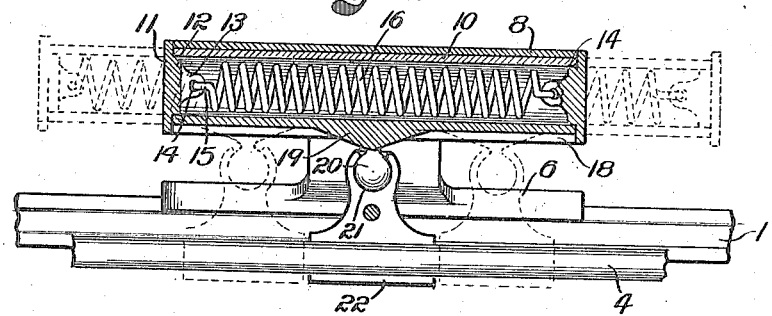
Fig. II.
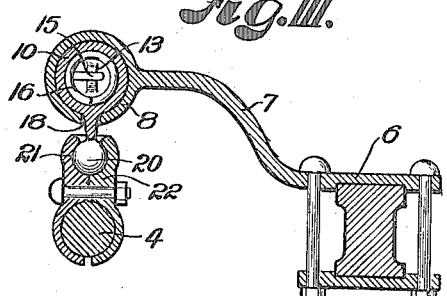
Fig. III.
WITNESSES:
Lynn A. Robinson.
Leta E. Coaty
INVENTOR
Henry J. Miller.
BY
ATTORNEY

UNITED STATES PATENT OFFICE.

HENRY J. MILLER, OF KANSAS CITY, MISSOURI, ASSIGNOR, BY DIRECT AND MESNE ASSIGNMENTS, OF ONE-FOURTH TO J. H. MILLER, OF KANSAS CITY, MISSOURI, ONE-HALF TO SAFETY MANUFACTURING COMPANY, A CORPORATION OF MISSOURI, AND ONE-FOURTH TO THE EVERGLADES SUGAR & LAND CO., OF MIAMI, FLORIDA, A CORPORATION OF FLORIDA.

SAFETY STEERING DEVICE.

1,207,693.     Specification of Letters Patent.     Patented Dec. 5, 1916.

Application filed October 12, 1914. Serial No. 866,277.

*To all whom it may concern:*

Be it known that I, HENRY J. MILLER, a citizen of the United States, residing at Kansas City, in the county of Jackson and State of Missouri, have invented certain new and useful Improvements in Safety Steering Devices; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to safety steering devices, and has for its principal object to provide a device of that character for automatically retarding unguided lateral motion of a stering mechanism of a motor vehicle and automatically returning said mechanism to neutral position. In accomplishing this object I have provided improved details of structure, the preferred forms of which are illustrated in the accompanying drawings, wherein:—

Figure I is a perspective view of part of the front axle of an automobile, showing the knuckled mounting of one of the wheels with the connecting rod, and the combination of my safety steering device therewith. Fig. II is an enlarged longitudinal section of a safety steering device. Fig. III is a transverse section thereof.

Referring more in detail to the parts:—
1 designates the front axle, 2 a steering element, 3 the wheel, and 4 the connecting rod of an automobile or motor vehicle; such parts being of any ordinary and well known construction and forming no part of my invention, considered separately from the safety steering mechanism.

Rigidly mounted on the axle 1 is a bracket 6 having a rearwardly extending neck 7 overlying the knuckle connecting rod 4.

On the rear end of the neck 7 is a cylinder 8 which is held rigid relative to the axle by a rigid mounting of the neck and bracket.

Slidably mounted within the cylinder 8 is an inner cylinder or slide 10 having open ends, and closing the open ends of the said cylinders are caps 11, each of which has a boss 12 on its inner face projected into the slide cylinder 10 and provided with a boss 13, having an aperture 14 for receiving the hook end 15 of a coil spring 16 which nests within the slide cylinder and connects the end caps 11, so that the latter are yieldingly held against the ends of the slide and rigid cylinders.

The rigid outside cylinder 8 has a slot 18 in its under edge and the slide cylinder is provided with a rib 19 which is adapted for travel in the slot 18 and carries a ball 20 on its lower end, which seats in a socket 21 on a clamp 22 which is rigidly fixed to the knuckle connecting rod 4, so that the slide cylinder may have limited universal movement relative to the connecting rod while being anchored thereto.

In using the device, presuming the parts to be constructed and assembled as described, when the wheel is traveling in a direct line, the tension of the spring will tend to hold the connecting rod and steering mechanism in neutral position, but is yielding in order to permit flexibility of the steering mechanism under jolts and jars; it being apparent that should one of the wheels strike an obstruction which would tend to deflect the wheels and steering mechanism, the spring would yield to permit the deflection, but would immediately return the parts to their normal position. It is also apparent that when the vehicle is to be turned the knuckle mechanism may be operated in the usual manner, so that the connecting rod is swung to either the right or the left, thereby pushing the slide cylinder in a corresponding direction against the tension of the contained spring, and that as soon as the operator removes the pressure from the steering mechanism the safety device will immediately return the steering mechanism to neutral position, so that the car will drive in a direct line.

Having thus described my invention, what I claim as new therein, and desire to secure by Letters-Patent, is:—

1. The combination with relatively fixed and movable members of an open end cylinder on one of the members, having a longitudinal slot, a slide in said cylinder having a rib projected through the slot and connected with the other of said first named members, caps closing the ends of the cylinder when the parts are in normal position, and a spring located within the slide and connecting said caps.

2. The combination with fixed and movable brackets, of a cylinder on one of the brackets, having a longitudinal slot, free cap members at the ends of the cylinder, a spring located within the cylinder and connected with both of said cap members, a slide located within the cylinder and having a rib extending through the cylinder slot and connected with the other bracket, whereby movement of the brackets relative to each other will induce contact of one end of the slide with one of the caps, to project the cap away from the cylinder against the tension of said spring.

3. The combination with a connecting rod and axle of a bracket on the axle having a cylinder overlying and arranged longitudinally relative to the connecting rod, the said cylinder having open ends and having a longitudinal slot facing the rod, a bracket fixed to the connecting rod, a slide in said cylinder having a rib thereon projected into said slot and connected with the rod bracket, a spring located within the slide, and free cap members at opposite ends of the cylinder connected with the spring, whereby projection of the slide in either direction will move a relative cap member away from the cylinder to permit the connecting rod and axle to move against the tension of said spring and whereby the parts are returned to normal position under the spring tension.

4. A safety appliance for motor vehicle steering mechanism, the same comprising concentric members, means for connecting one of such members to the axle, other means for connecting the remaining member to the drag link, a spring arranged within the concentric members, and connecting means at the extremities of the spring engaging both ends of the concentric members, the parts being disposed to effect a stretching of the spring between the outer ends of the members upon a relative movement of the members in one direction or the other.

5. A safety appliance for the steering mechanism of motor vehicles, the same comprising concentric members, a spring arranged within such members, means at the ends of the spring for sustaining the tension thereof engaging the extremities of the concentric members, and means entering the inner member and serving to centralize and retain the connecting means at the ends of the spring in proper position.

6. A safety appliance for the steering mechanism of motor vehicles, the same comprising a member having an outer projection, a second member receiving the first-mentioned member and provided in a side with a longitudinal opening to receive the projection of the first-mentioned member, a spring disposed within the inner member, and means at the ends of the spring for sustaining the tension thereof engaging the extremities of the inner and outer members.

7. A safety steering attachment for automobiles, comprising an arm rigid with the front axle of the automobile and provided with a transversely extending tubular head, a member slidably engaging said head, a pair of caps normally engaging the ends of the head and said slidable member, guiding means to prevent sidewise movement of said caps, and a retractile spring means secured at opposite ends to said caps and tending to hold the same against the opposite ends of said head and slidable member.

8. A safety steering attachment for automobiles, comprising an arm rigid with the front axle of the automobile and provided with a transversely extending tubular head, a member slidably engaging said head, a pair of caps normally engaging the ends of the head and said slidable member, guiding means to prevent sidewise movement of said caps, and a retractile spring means secured at opposite ends to said caps and tending to hold the same against the opposite ends of said head and slidable member, in combination with an arm rigid with the connecting rod of the automobile and connected to impart endwise movement in one direction or the other to the said slidable member to cause the same to move the cap in advance of it away from the corresponding end of the tubular head.

In testimony whereof I affix my signature in presence of two witnesses.

HENRY J. MILLER.

Witnesses:
LYNN A. ROBINSON,
LETA E. COATS.